(12) United States Patent
Saund et al.

(10) Patent No.: US 6,570,612 B1
(45) Date of Patent: May 27, 2003

(54) SYSTEM AND METHOD FOR COLOR NORMALIZATION OF BOARD IMAGES

(75) Inventors: Eric Saund, San Carlos, CA (US); David H. Marimont, Palo Alto, CA (US)

(73) Assignee: Bank One, NA, as Administrative Agent, Chicago, IL (US)

( * ) Notice: Subject to any disclaimer, the term of this patent is extended or adjusted under 35 U.S.C. 154(b) by 0 days.

(21) Appl. No.: 09/158,443

(22) Filed: Sep. 21, 1998

(51) Int. Cl.[7] .............................................. H04N 5/225
(52) U.S. Cl. .................................... 348/218.1; 348/239
(58) Field of Search ..................... 348/207.99, 207.1, 348/207.11, 218.1, 222.1, 239, 335; 382/282, 283, 284

(56) References Cited

U.S. PATENT DOCUMENTS 5,528,290 A     6/1996   Saund
5,581,637 A     12/1996   Cass et al.
6,104,438 A   *   8/2000   Saito ........................... 348/239
6,175,663 B1 *   1/2001   Huang ......................... 345/589
6,211,913 B1 *   4/2001   Hansen et al. ............ 348/218.1
6,366,316 B1 *   4/2002   Parulski et al. ............. 345/634

* cited by examiner

Primary Examiner—Tuan Ho

(57) ABSTRACT

A system and method are provided to normalize colors in an image of a board surface so as to eliminate effects of variable illumination, and in the case of mosaic images, to eliminate visible seams between tiles. Each pixel is classified as foreground or background, where foreground pixels contain ink marks. An efficient smoothing process estimates the ideal background color of all pixels, including the foreground pixels. The estimated background color is used to normalize each pixel's color such that in the final image, artifacts arising from camera gain and uneven lighting of the board surface are eliminated.

14 Claims, 13 Drawing Sheets

(4 of 13 Drawing Sheet(s) Filed in Color)

SYSTEM AND METHOD FOR COLOR NORMALIZATION OF BOARD IMAGES

CROSS REFERENCE TO RELATED APPLICATIONS

This application is related to commonly assigned U.S. Pat. No. 5,528,290 to Saund entitled "Device for Transcribing Images on a Board Using a Camera Based Board Scanner" (filed Sep. 9, 1994) and commonly assigned U.S. Pat. No. 5,581,637 to Cass et al. entitled "System for Registering Component Image Tiles in a Camera-Based Scanner Device Transcribing Scene Images" (filed Apr. 16, 1996 as a continuation of U.S. Ser. No. 353,654, Dec. 9, 1994, now abandoned), both of which are incorporated herein by this reference.

BACKGROUND OF THE INVENTION

This invention relates to a system and method for color normalization of board images including images of whiteboards, blackboards and other surface media (herein referred to as "boards"). More particularly, the invention is directed to normalizing colors of images of a board surface to eliminate the effects of variable illumination and, in the case of mosaic images, to eliminate visible seams between tiles. The background color is used to normalize the color of the pixels such that undesired artifacts arising from camera gain and uneven lighting are eliminated.

While the invention is particularly directed to the art of image processing and color normalization, and will thus be described with specific reference thereto, it will be appreciated that the invention may have usefulness in other fields and applications.

By way of background, boards are widely used to maintain hand drawn textual and graphic images on a "wall size" surface. This medium offers certain properties that facilitate a variety of interactive work practices. However, a drawback to using a board is that information is not easily transferred to other media.

Accordingly, devices such as that disclosed in U.S. Pat. Nos. 5,528,290 and 5,581,637 were developed. With such devices, boards are scanned using a technique of image mosaicing, whereby high resolution images of large surfaces are obtained with low resolution imaging devices. When using mosaicing, several snapshots of different regions, or tiles, of the surface are assembled to form a larger composite image.

Undesired image artifacts can occur in image mosaicing, however, creating apparent seams in the final composite image. For example, image misalignment artifacts occur when the overlap regions of the adjacent image tiles do not properly align with one another. In addition, lightness and color artifacts are generated when the tiles line up properly but the intensity levels, contrast, or color balance of adjacent tiles are not matched.

The present invention provides a new and improved image processing method for color images which overcomes problems and difficulties associated with lightness and color artifacts. The system and method is applicable to single-snapshot (or tile) images as well as mosaic images comprised of a plurality of tiles.

SUMMARY OF THE INVENTION

A system and method are provided to normalize colors in an image of a board surface to eliminate effects of variable illumination and, in the case of mosaic images, to eliminate visible seams between tiles. The background color of the image is normalized so that artifacts are eliminated.

In one aspect of the invention, a board or surface image is input into the system via a video camera and a processor. Image arrays for each color channel are generated, and a determination is made whether pixels are background pixels or foreground pixels. Next, a background image array is generated and filtered for each color channel. The image arrays are then divided by a corresponding filtered background image array.

In another aspect of the invention, in an image mosaic of a whiteboard scene, normalization is performed for each image snapshot independently.

In another aspect of the invention, the mosaic images are reconstructed to form a final image.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The patent or application file contains at least one drawing executed in color. Copies of this patent or patent application publication with color drawings will be provided by the office upon request and payment of the necessary fee.

The present invention exists in the construction, arrangement, and combination, of the various parts of the device and steps of the method, whereby the objects contemplated are obtained as hereinafter more fully set forth, specifically pointed out in the claims, and illustrated in the accompanying drawings in which:

DETAILED DESCRIPTION OF THE PREFERRED EMBODIMENTS

Figure 1:
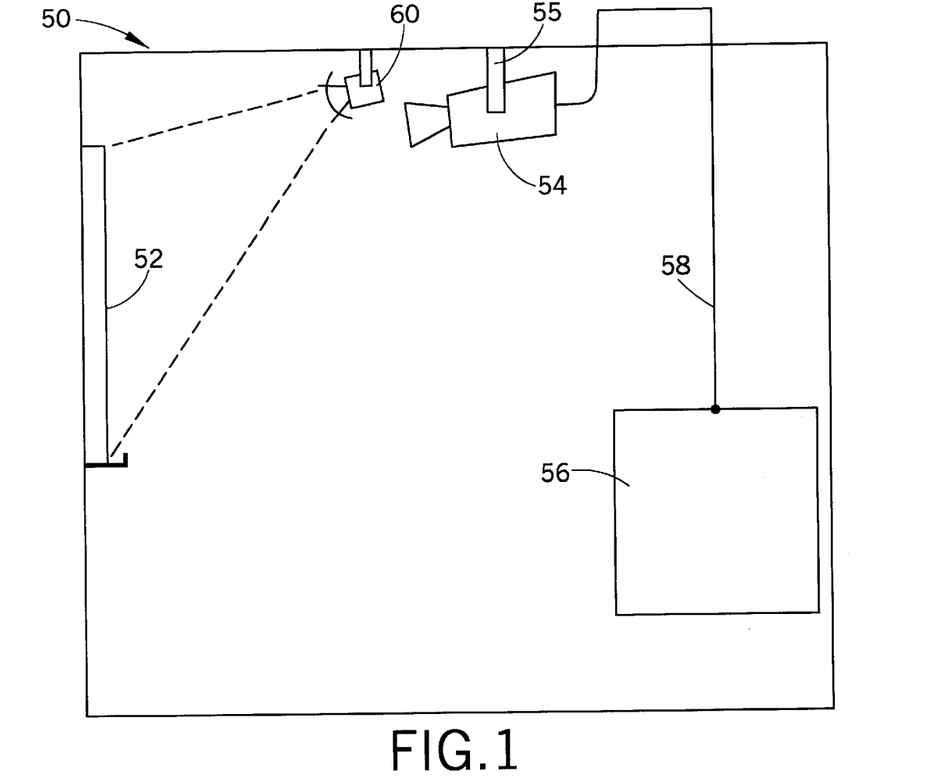
FIG. 1 is a representative side view of the system according to the present invention.
Figure 2:
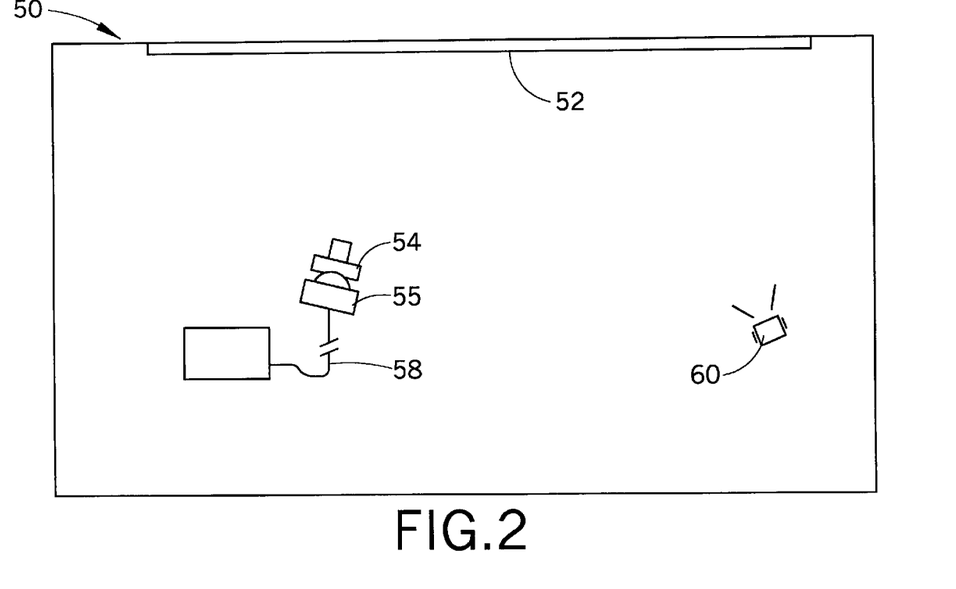
FIG. 2 is a representative top view of the system according to the present invention.

Referring now to the drawings wherein the showings are for purposes of illustrating the preferred embodiments of the invention only and not for purposes of limiting same, FIGS. 1 and 2 provide a view of the overall imaging system incorporating the method of the present invention. As shown, a system 50 includes a board 52 that accepts markings from a user. As noted above, a "board" may be either a whiteboard, blackboard or other similar wall-sized surface media used to maintain hand drawn textual and graphic images. The description following is based primarily on a whiteboard with dark colored markings. It will be recognized by those of skill in the art that a dark colored board with light colored marking may also be used, with some parameters changed to reflect the opposite reflectivity. Likewise, boards of varying colors may be used.

Camera subsystem 54 captures an image or images of the board, which are fed to computer system 56 via a network 58. Computer system 56, only representatively shown, includes a processor and memory for storing instructions and electronic and computational images. Computer system 56 also includes a suitable printer or other output device to output the images that are input and processed according to the present invention. It is to be appreciated that the system 56 includes suitable software and hardware to implement the method steps of the present invention as will be apparent to those of skill in the art upon a reading of the description herein.

In general, the resolution of an electronic camera such as a video camera will be insufficient to capture an entire board image with enough detail to discern the markings on the board clearly. Therefore, several zoomed-in images of smaller subregions of the board, called "image tiles," must be captured independently, and then pieced together.

Camera subsystem 54 is mounted on a computer-controlled pan/tilt head 55, and directed sequentially at various subregions, under program control, when an image capture command is executed. Camera subsystem 54 may alternately comprise an array of fixed or rotatable cameras, each directed at a different subregion or subregions. For the discussion herein, camera subsystem 54 may be referred to as simply camera 54.

Figure 3:
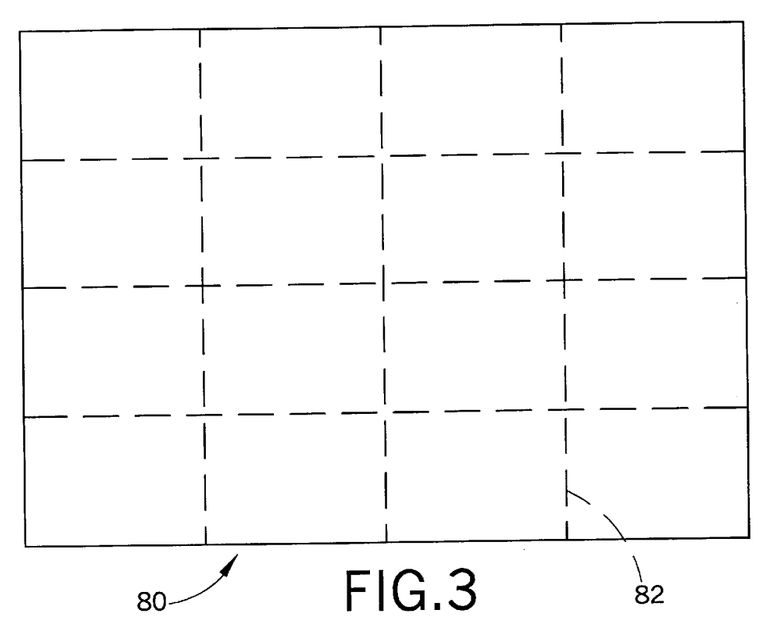
FIG. 3 is an example grid pattern that may be projected upon a board.

Also included is a light projecting device 60 to illuminate the board. In one embodiment, the device 60 projects a registration pattern, such as a grid of lines or dots, onto the surface being imaged. FIG. 3 shows an example grid pattern 82 that may be projected upon a whiteboard 80. Using this system, video camera 54 may take two sequential images at one camera position—one of the surface illuminated by the projected registration pattern, and one without the pattern. The underlying surface markings are derived conceptually by XORing the images. The pattern projected can be chosen to best suit the specific properties of the camera and the imaging environment.

Figure 4:
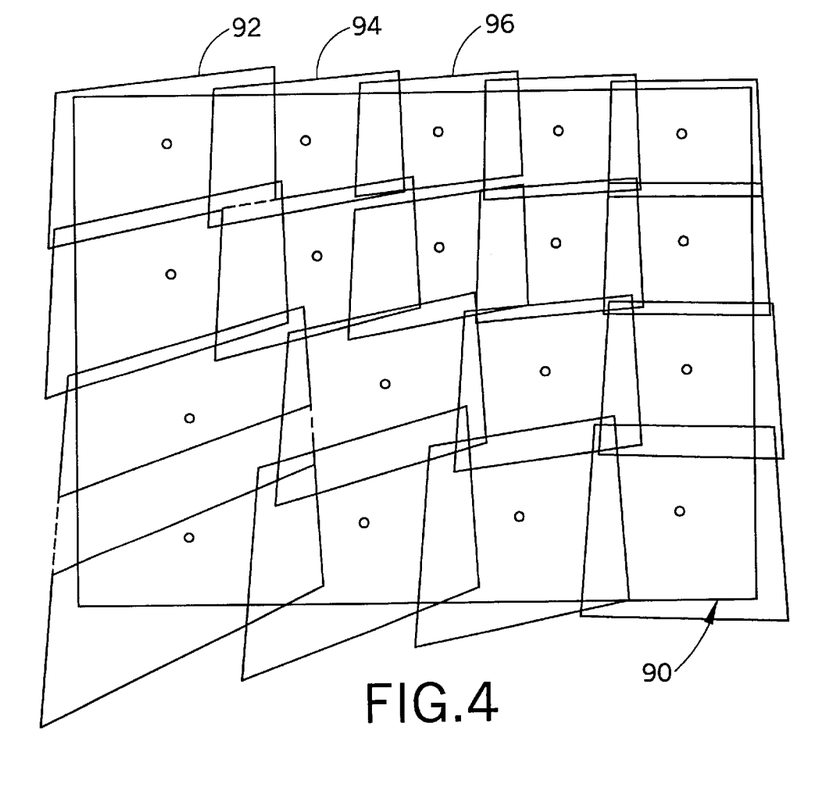
FIG. 4 illustrates image tiles scanned from sections of a board.

The scanned image sections are captured as "tiles". Each tile is a portion of the image scanned by a camera, as shown in FIG. 4. A whiteboard 90 is captured as a series of tiles, 92, 94, etc. The tiles slightly overlap with neighboring tiles, so that the entire image is scanned with no "missing" spaces. The location of each tile is known from the position and direction of the camera on the pan/tilt head when the tile is scanned. The tiles may be described as "raw image" or "camera image" tiles, in that no processing has been done on them to either interpret or precisely locate them in the digital image.

The "raw" image tiles will in general overlap one another, contain perspective distortion due to the off-axis viewpoint of the camera, and contain uneven lightness levels across the board between foreground (written marks) and background (unmarked board) due to uncontrolled lighting conditions and reflections. The present invention is directed to a method of normalizing the background to compensate for the effects of uneven lighting.

More particularly, lightness and color artifacts arise from the interaction of camera and/or photographic processes and uneven lighting of a scene. In a typical situation of scanning a whiteboard with a video camera—as illustrated in FIGS. 1 and 2—almost every viewed scene is unevenly lighted, although it is rarely apparent to the human visual system.

Figure 5A:
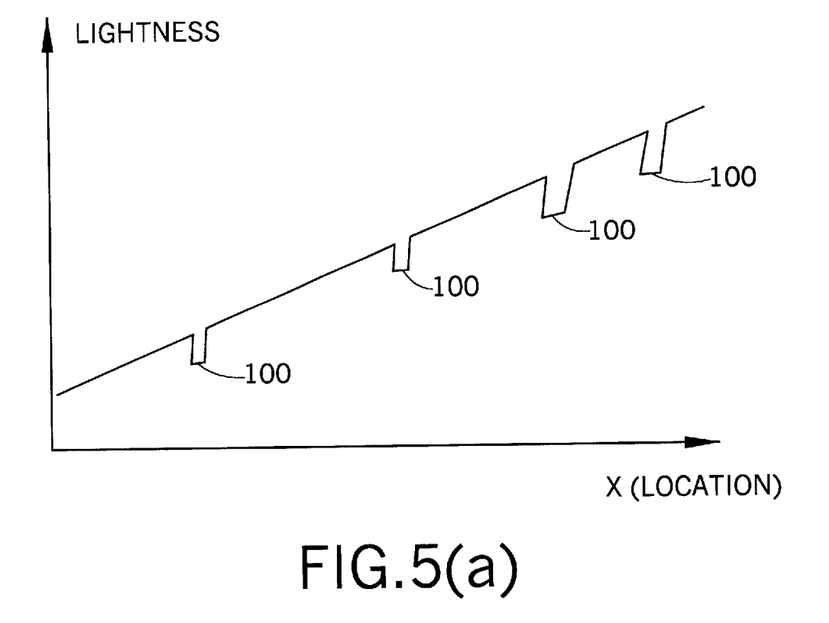
FIGS. 5(a) and (b) are graphs illustrating lightness profiles of a board.

In order to obtain optimum performance, video cameras have automatic gain control (AGC) mechanisms that adjust for variations in scene lightness and put the average intensity of an image into a fixed range. As a result, the pixel values corresponding to a given location on a surface will vary according to where the camera is pointed. If the camera is directed at a lighter part of a scene, the camera gain will adjust downward and that location's pixel value will be adjusted downward, or darker. If the camera is pointed at a relatively dark part of the scene, the gain is increased and that location's pixel value will be adjusted upward, or lighter. This is illustrated in FIG. 5(a) which shows light intensity as a function of position plotted.

The discontinuities 100 represent locations where, for example, a foreground marking exists. Discontinuities might also represent noise components. Similar discontinuities should likewise be recognized as representative markings in connection with FIGS. 5(b), 9(b), and 12(b). The discontinuities in FIG. 10(b) actually represent locations from which dilated foreground markings have been removed. In addition, it should be appreciated that the graphs of FIGS. 5(a), 5(b), 9(b), 10(b), 11(b) and 12(b) only generally represent and do not precisely correspond to the actual images of FIGS. 6, 9(a), 10(a), 11(a) and 12(a). For example, the illustrated levels are not quantified and the discontinuities do not have direct correspondence to the actual markings (or removed markings in the case of FIG. 10(b)), but only represent a few samples. However, from the figures, those of skill in the art will be able to understand the actual correspondence between the graphs and images. Moreover, it should be understood that the graphs of FIGS. 5(a), 5(b), 9(b), 10(b), 11(b) and 12(b) represent cross-sectional views of the corresponding images.

Figure 5B:
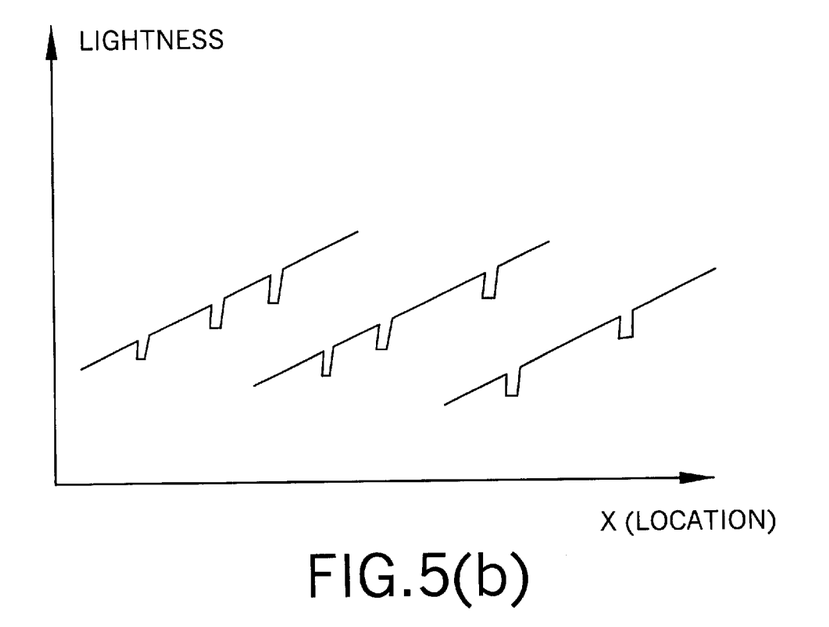
Figure 6:
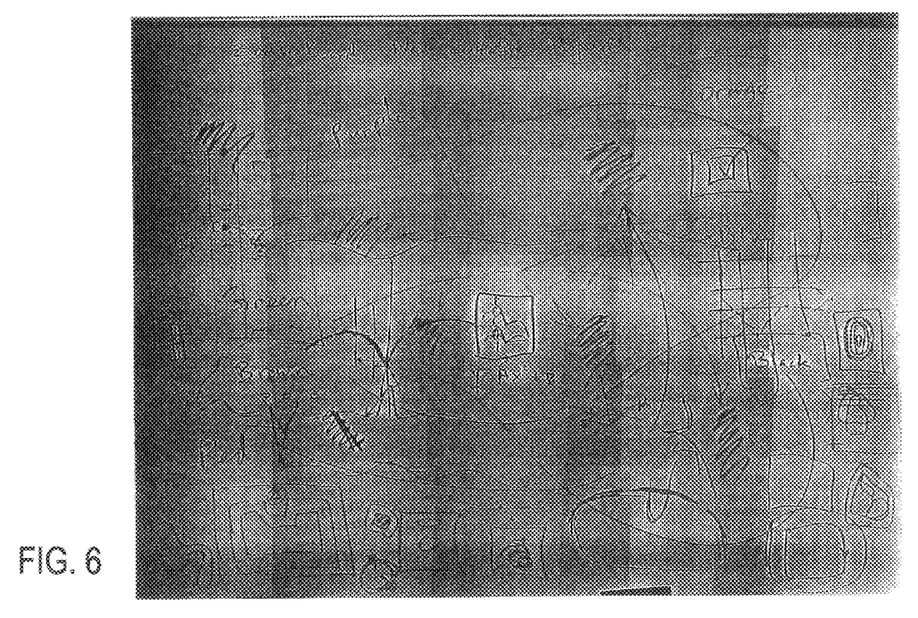
FIG. 6 is an image having the intensity profile resembling that of FIG. 5(b)

The typical result of mosaicing images is a stairstepping effect as depicted in FIG. 5(b), with representative foreground markings shown by the discontinuities, and as shown in an actual mosaic image in FIG. 6. This effect is compounded when several illuminants with different color distributions are present.

The approach of the present invention to compensate for these effects is to adjust, or normalize, every pixel according to some factor that will cause pixels from overlapping regions of neighboring tiles to be given the same value. For mosaics of natural scenes, which are typically highly textured, suitable normalization factors can be computed by various techniques based on uniform averaging of pixel intensities in local regions, and on finding a global white point in the scene.

The present invention is directed toward single images and mosaic images of whiteboards, which, unlike natural scenes, are characterized by a uniform color surface sparsely populated with ink markings of various colors. It is desirable in the final image for every pixel corresponding to whiteboard surface to be given the same "white" value, and for ink markings of any given color to appear uniform in color across the entire image, regardless of the original lighting, camera exposure conditions, and surrounding marks. In order to achieve this, normalization factors are used that are grounded in the physics of the lighting conditions and camera operating parameters.

The basic physical model is that the lightness L of each observed pixel in a camera image is the product of an illumination term I and a surface reflectance term R, in each of the color channels, red, green and blue. I, L, and R all lie in the range from 0 to 1.

$$L_r = I_r R_r \tag{1}$$

$$L_g = I_g R_g \tag{2}$$

$$L_b = I_b R_b \tag{3}$$

The illumination term incorporates both incident light hitting the board and camera exposure parameters such as AGC, or automatic gain control. The goal of the color normalization step is to recover the reflectance terms R in the above equations (1)–(3). For each pixel in the image, an estimate of the illumination terms I is needed.

The color of the whiteboard is assumed to be white. That is, reflectance R is assumed to equal 1.0 in every color channel. Conversely, the reflectance for ink is less than 1.0 in one or more of the three color channels.

If it is known that a given pixel corresponds to whiteboard instead of ink, then the illumination term in each color channel can be recovered directly from the observed lightnesses. In this invention, the illumination term I is estimated for non-whiteboard (ink) pixels and is then used to recover the reflectance of the surface markings corresponding to these pixels. This is accomplished by segmenting pixels into background pixels corresponding to whiteboard and foreground pixels corresponding to ink, then interpolating presumed background lightness functions into the foreground regions. The image is subsequently normalized by dividing out the background.

Figure 7:
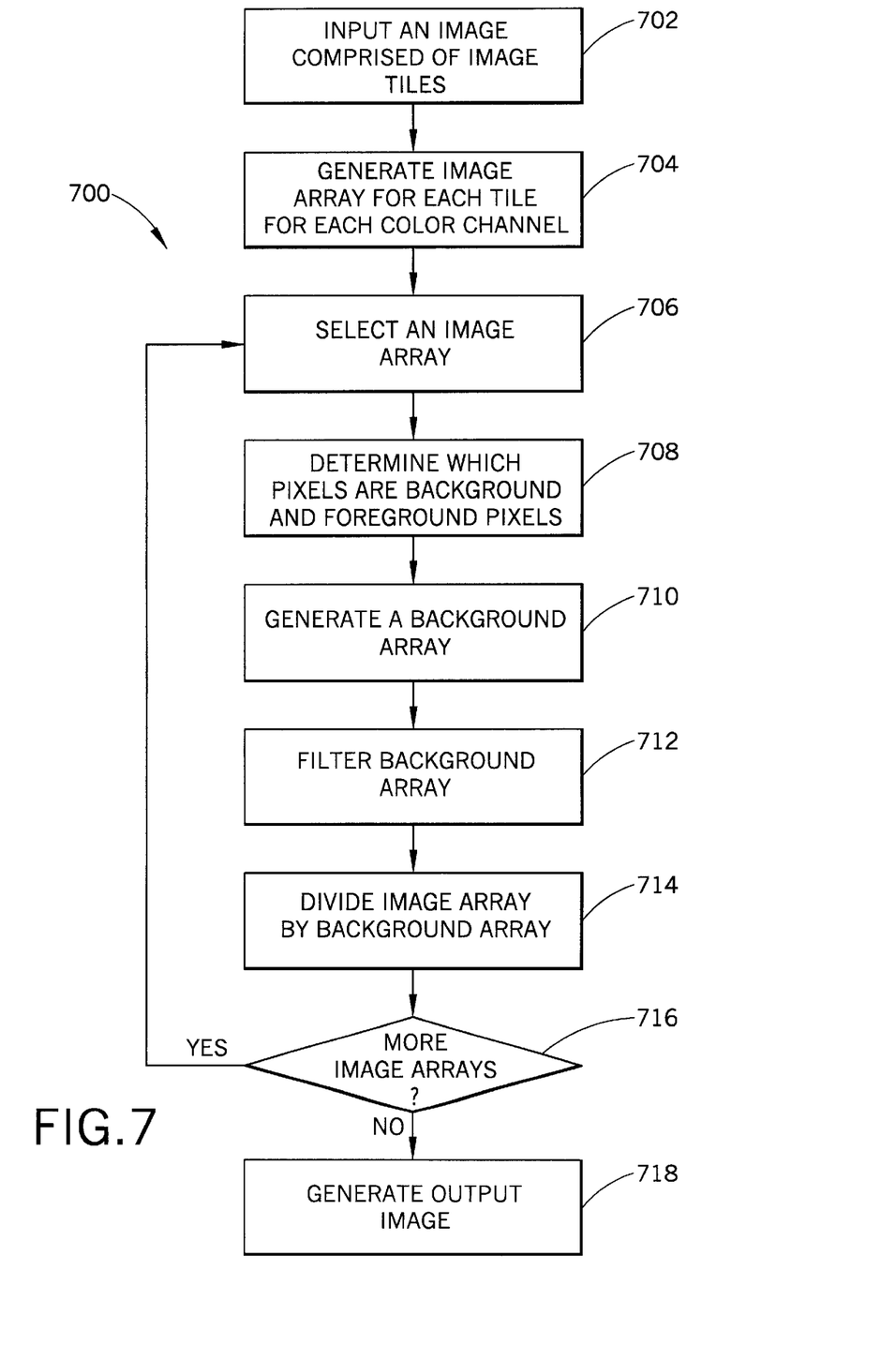
FIG. 7 is a flowchart illustrating the method of the present invention.
Figure 8:
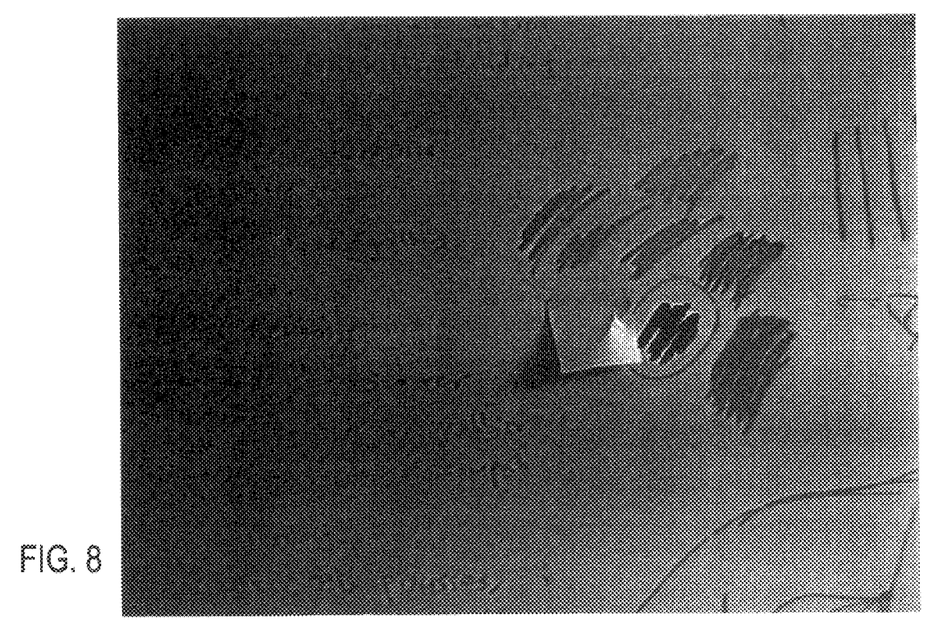
FIG. 8 shows an input image.

In the preferred embodiment of the invention, the method 700 proceeds as shown in FIG. 7. An image of a board comprised of image tiles is input to the system, e.g. through the camera 54 to the computer 56 via the network 58 (step 702). A sample input image is shown in FIG. 8 (which is representative but does not correspond to any tile of FIG. 6).

Figure 9A:
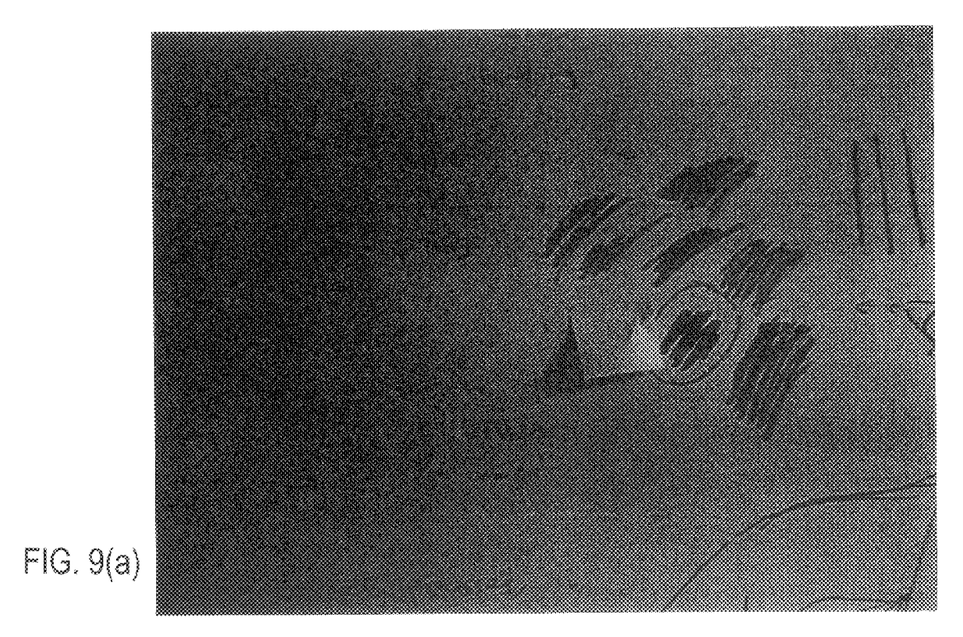
FIG. 9(a) shows an intensity image corresponding to the input image of FIG. 8.
Figure 9B:
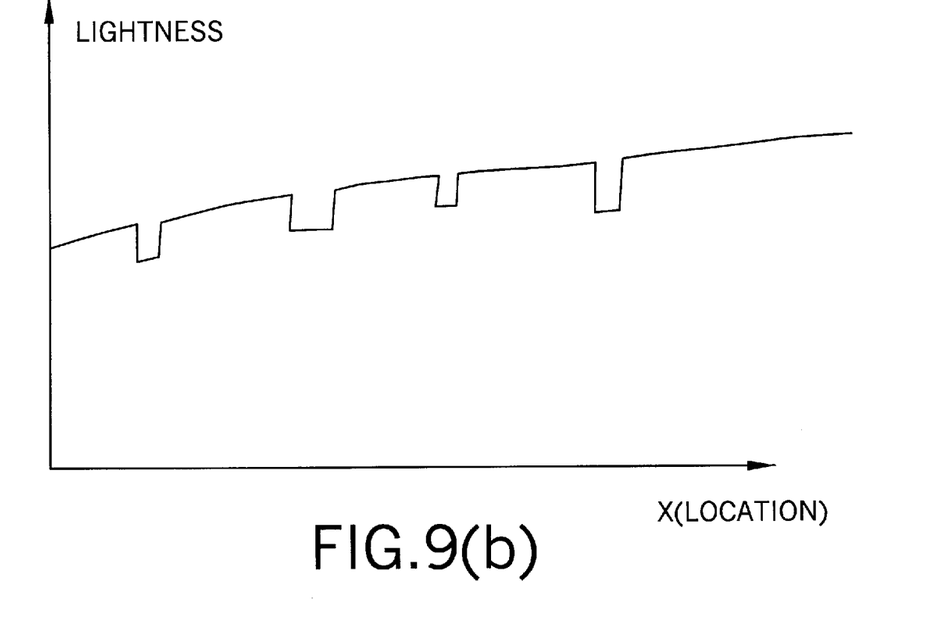
FIG. 9(b) is a graph showing the lightness profile of the image of FIG. 9(a)

Image arrays are then generated for each tile in each color channel of, for example, RGB color space (step 704). A sample image array for the red channel of the sample image tile (FIG. 8) is shown in FIG. 9(a). FIG. 9(b) is a graph of the lightness profile for the image tile of FIG. 9(a). Again, as for all such graphs herein, the discontinuities are representative of foreground markings that may be in FIG. 9(a), but do not necessarily directly correspond to the actual foreground markings. Note that as shown in FIG. 9(a), the graph generally shows that lightness is less for the locations on the left side of the image tile as compared to the right side.

Steps 702 and 704 are, of course, accomplished using the techniques described above and in the patents incorporated herein by reference. This will be apparent to those of ordinary skill in the art. It is also to be recognized that other processes may be applied, concurrently or sequentially, to the image to address other difficulties noted above, e.g. distortion. For simplicity, the discussion herein is primarily directed to correcting artifacts resulting from, for example, uneven lighting and camera gain.

An image array corresponding to an image tile is then selected for processing (step 706). It is to be appreciated that each image tile has an image array generated for each color channel. Therefore, in the preferred embodiment, each image tile has three (3) corresponding image arrays that will ultimately require selection and processing. As noted above, in the preferred embodiment, an image will be comprised of a plurality of image tiles. However, the present method and system are equally applicable to an image having only a single tile.

Each pixel of the array is assigned a label, either background (e.g. board surface) or foreground (e.g. ink), according to its intensity and its proximity to the white axis in RGB color space (step 708). This is accomplished by processing in an overall intensity channel with a center-surround filter, and the resulting foreground-labeled image regions expanded with a morphological dilation operation.

More specifically, the center-surround filter is applied to each pixel. These filters are well known, but it should be recognized that a center-surround filter operates by obtaining an average pixel value over a large region surrounding the subject pixel. The average value is then subtracted from the pixel so that the pixel has a value other than zero only if it is brighter or darker than the local background. That is, if a pixel has a value that is the same as the background value, subtracting the background will result in a zero value. A thresholding routine is then applied to mark locally dark pixels as foreground.

To make sure that sufficient foreground pixels are marked, a morphological dilation operation is applied to transform the image. These operations are well known. Briefly, in the preferred embodiment, a mask or structuring element is formed and applied to sets of pixels. Depending on the precise nature of the mask, pixels are turned on or off when the mask is applied thereto. Here, the mask is formed so that the foreground images are expanded or dilated.

Figure 10A:
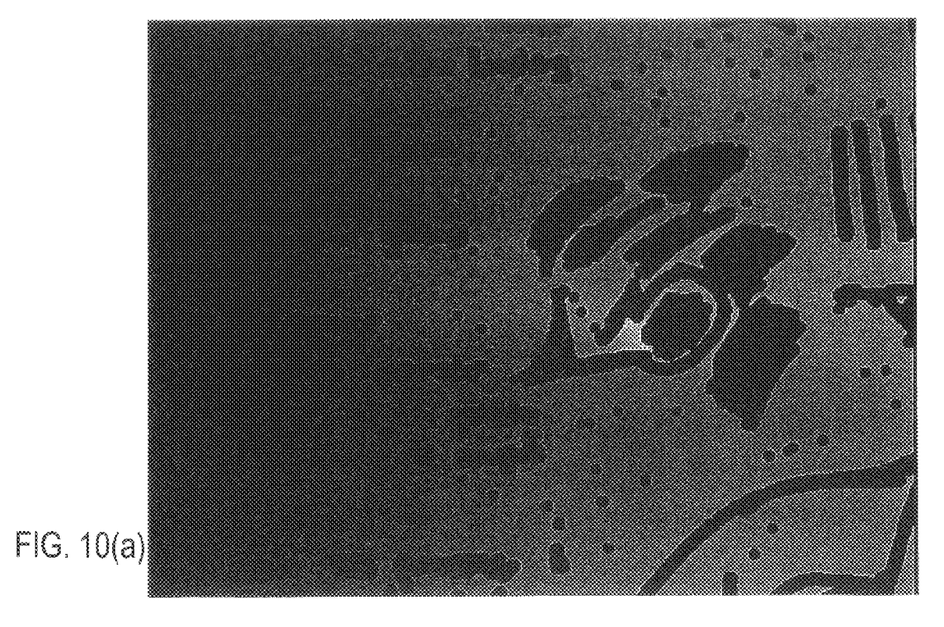
FIG. 10(a) shows a background segmented image corresponding to the image of FIG. 9(a)

A background array is then generated (step 710) by removing the dilated foreground images. FIG. 10(a) shows the background array of the image tile shown in FIG. 9(a) having the foreground pixels segmented out.

Figure 10B:
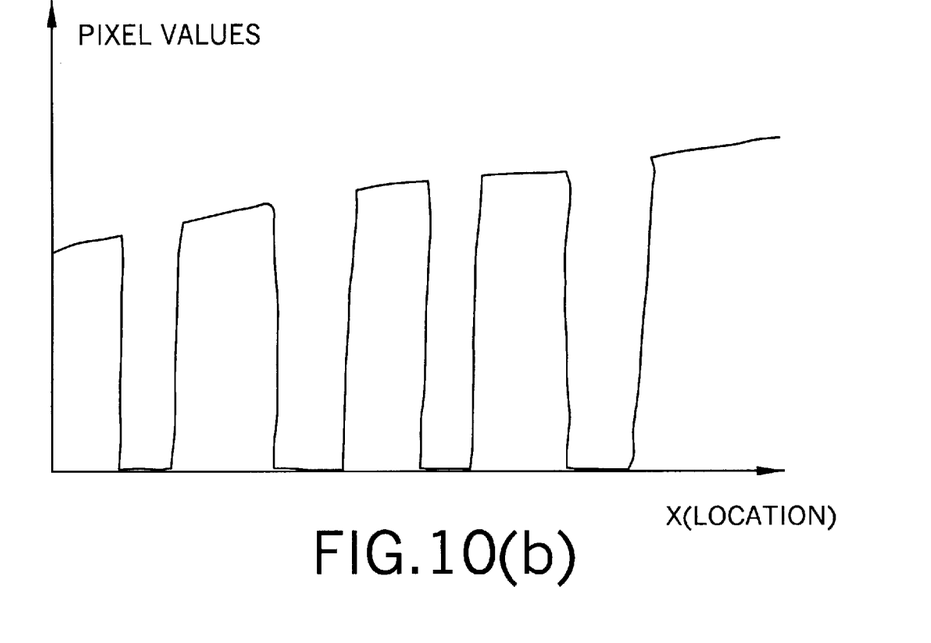
FIG. 10(b) is a graph showing pixel values of the image of FIG. 10(a)

FIG. 10(b) shows a graph of the profile for the background array of FIG. 10(a). Note that the discontinuities are wider and show pixel value reduction to zero when compared to FIG. 9(b). This is because the foreground markings are dilated and then removed from the image, thus leaving large holes in the array.

The background array is smoothed, or filtered, using a modified exponential smoothing routine to not only smooth background values but also to fill in (or interpolate) the background values for pixels labeled as foreground in the original image (step 712).

A standard exponential smoothing technique operates by performing a causal, separable, exponential filter over the image in four directions, left-to-right, right-to-left, top-to-bottom, and bottom-to-top. In each pass, the value of a pixel V is replaced by a weighted average of it and its predecessors:

$$V'_x \leftarrow \alpha V_x + (1-\alpha) V'_{x-1}$$

where the index x indicates position along a row or column, $\alpha$ is a constant, the index x−1 indicates the previous position along the direction of the filter's pass and the prime notation indicates that the pixel has been modified in that pass.

In the present invention, this type of method is altered so that it smooths and interpolates a background image to obtain a modified background array. Thus, the filter (wherein the terms have the above meanings) takes the following form:

$$V'_x \leftarrow \begin{cases} \alpha V_x + (1-\alpha)V'_{x-1} & \text{if background pixel} \\ V'_{x-1} & \text{if foreground pixel} \end{cases}$$

Figure 11A:
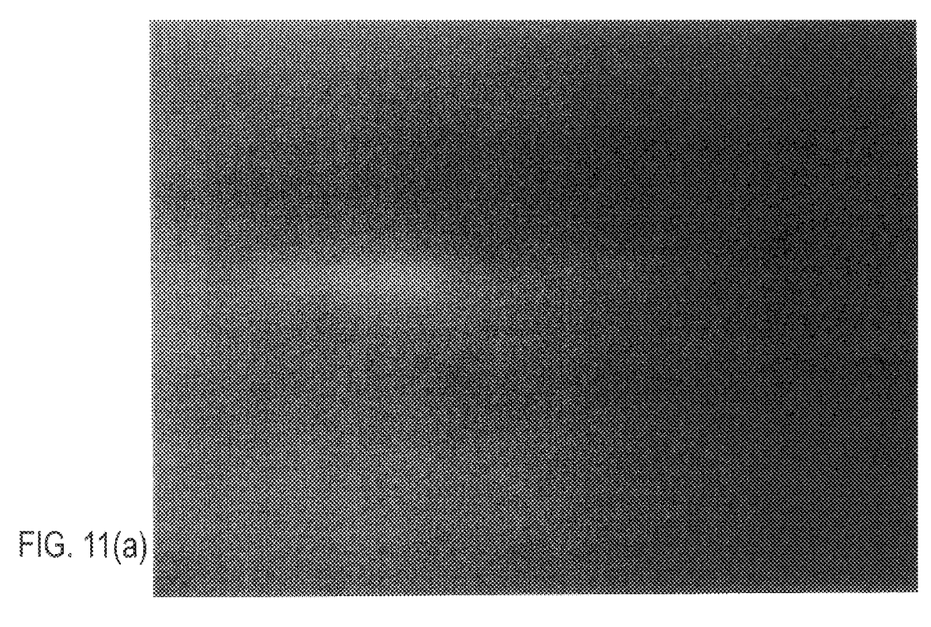
FIG. 11(a) shows an interpolated background array for the image of FIG. 10(a)

FIG. 11(a) shows an interpolated background array (based on the array shown in FIG. 10(a)) using the method of step 712, which we infer to be the physical illumination.

Figure 11B:
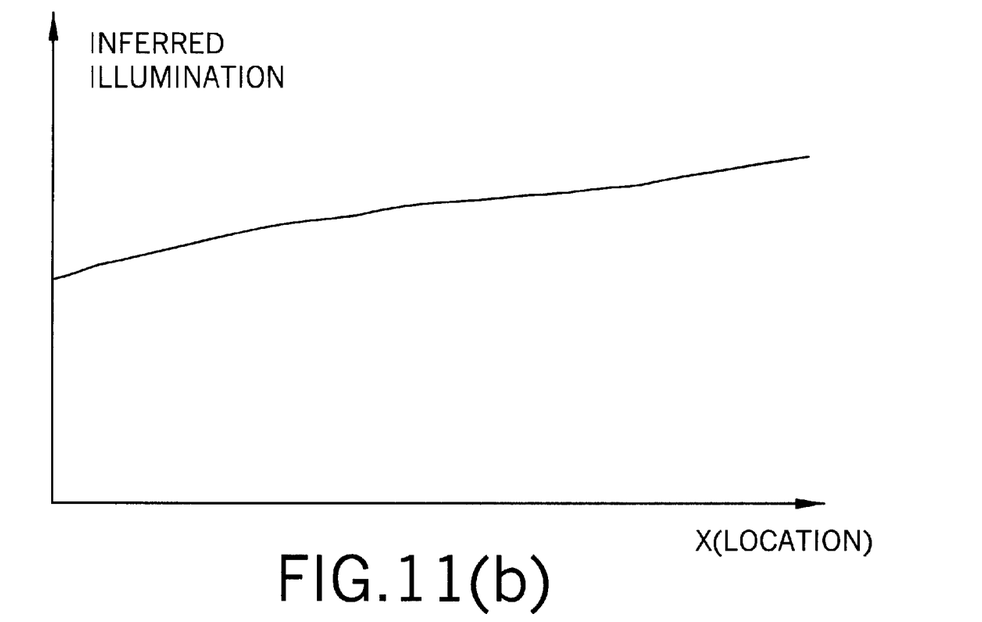
FIG. 11(b), is a graph showing the illumination profile for the array of FIG. 11(a)

FIG. 11(b) is a graph of the illumination profile showing the result of the smoothing method. Note that the discontinuities of FIG. 10(b) do not appear. It is to be emphasized that the filtering of the present invention will serve two primary purposes: 1) interpolate background values into foreground regions, and 2) smooth background values to effectively provide insensitivity to noise artifacts by smoothing over such noise artifacts present in the background.

Figure 12A:
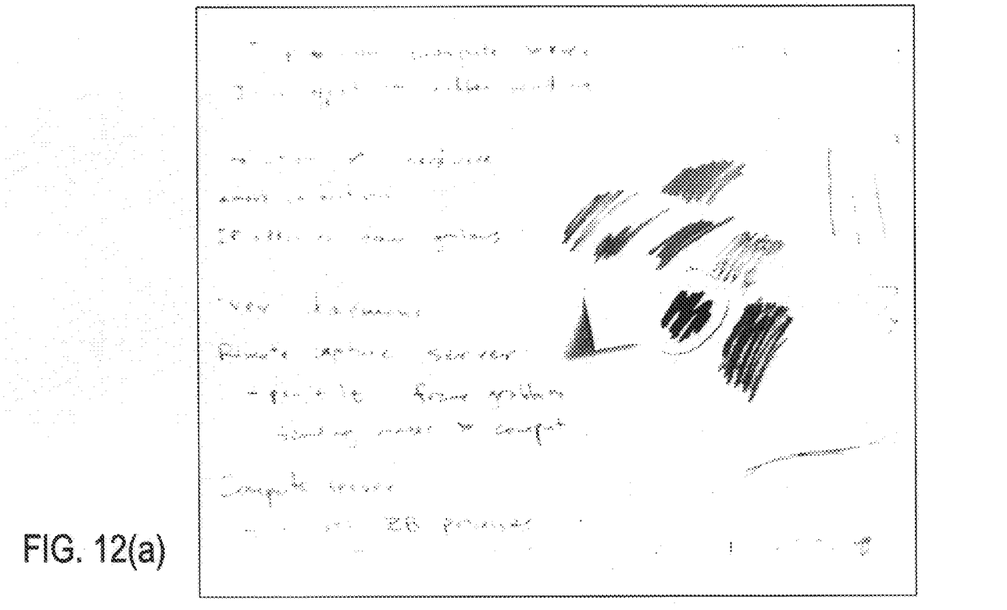
FIG. 12(a), shows a resultant normalized color image corresponding to the image of FIG. 8.
Figure 12B:
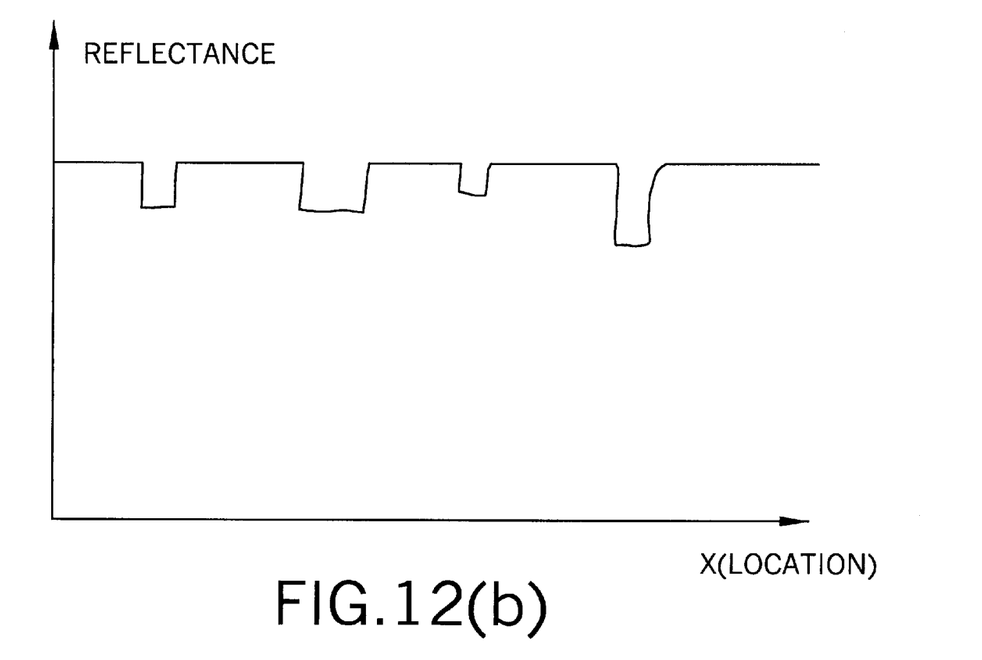
FIG. 12(b) is a graph showing the reflectance profile for the image of FIG. 12(a); and, FIG. 13 shows a resultant mosaic image relating generally to FIG. 6.

The original image tile is then normalized by dividing each color channel's lightness value by the estimated illumination value (step 714). This assigns pixels classified as background pixels the color (1,1,1) (white) and assign colors to background (ink) pixels with the illumination terms factored out. Image arrays for other color channels are then processed (steps 716, 706–714). FIG. 12(a) shows the resulting normalized test image tile. FIG. 12(b) is a graph of the reflectance profile for FIG. 12(a). Note that reflectance is constant for all background regions of the image.

In an image mosaic of a whiteboard scene, normalization is performed for each image snapshot independently. Thus, other image arrays for the channels of other tiles are also selected and processed (steps 716, 706–714). Because of the normalization, when the images are combined into the final composite (step 718), lightness artifacts are absent. It should be understood that the generation of the output image is accomplished using known techniques, for example, techniques described in the patents incorporated herein by reference.

Figure 13:
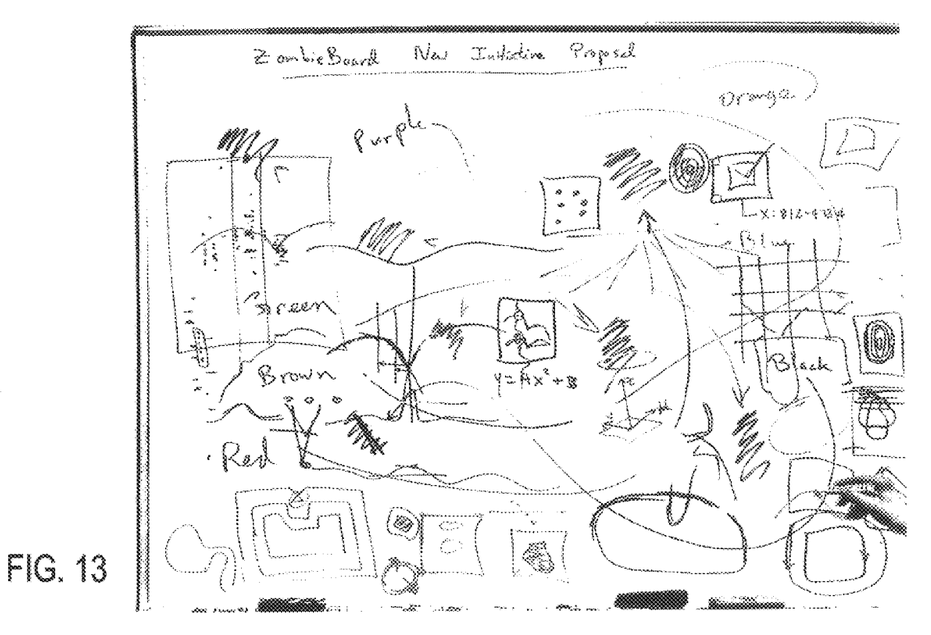

A reconstructed mosaic image is shown in FIG. 13. Note the absence of mosaicing lightness artifacts in comparison with FIG. 6. The background is white and colors are uniform. The images of FIGS. 6 and 13 do not include the example tile specifically shown and processed in FIGS. 8–12(b); however, it is to be appreciated that the processing herein could be effectively applied to the image of FIG. 6 to obtain a normalized, reconstructed image such as that of FIG. 13 (which is not identical to FIG. 6).

Once the output image is generated, the system 56 can store, print or otherwise process it. In an office environment, for example, a variety of ways of sharing the board image may be implemented.

The above description merely provides a disclosure of particular embodiments of the invention and is not intended for the purpose of limiting the same thereto. As such, the invention is not limited to only the above described embodiments. Rather, it is recognized that one skilled in the art could conceive alternative embodiments that fall within the scope of the invention.

Having thus described the invention, we hereby claim:

1. A method for color normalization of images of a surface, the surface having a background with foreground markings placed thereon, the method comprising steps of:
   inputting a surface image comprised of pixels;
   generating image arrays for each RGB color channel representing the image;
   determining for each image array which of the pixels of the image are background pixels representing the background of the surface and which of the pixels of the image are foreground pixels representing the foreground markings based on pixel intensity and proximity to the white axis in RGB color space;
   generating a background image array representing the background pixels for each RGB color channel based on the determining;
   modifying each background image array by replacing values corresponding to each of the background pixels by a weighted average of its own value and a value of its predecessor and replacing values corresponding to each pixel located in a position formerly occupied by a foreground pixel are replaced by a value of a predecessor pixel; and,
   dividing the image arrays by a corresponding modified background image array.

2. The method of claim 1 wherein the determining step includes applying a center-surround filter to each pixel.

3. The method of claim 2 wherein the determining step includes applying a thresholding routine to each pixel.

4. The method of claim 3 wherein the determining step includes applying a morphological dilation.

5. The method of claim 1 wherein generating the background array includes removing the foreground pixels from the image array.

6. The method of claim 1 wherein the filtering is performed using a filter of the following form:

$$V'_x \leftarrow \begin{cases} \alpha V_x + (1-\alpha)V'_{x-1} & \text{if background pixel} \\ V'_{x-1} & \text{if foreground pixel} \end{cases}$$

where V represents pixel values, the index x is a pixel location, α is a constant, the index x−1 indicates the previous pixel position along the direction of the filter's pass and the prime notation indicates a pixel modified in the pass.

7. A system adapted to normalize color images of a surface, the surface having a background with foreground markings placed thereon, the system comprising:
   means for inputting a surface image comprised of pixels;
   means for generating image arrays for each RGB color channel representing the image;
   means determining for each image array which of the pixels of the image are background pixels representing the background of the surface and which of the pixels of the image are foreground pixels representing the foreground markings;
   means for generating a background array representing the background pixels for each RGB color channel based on the determining;
   means for filtering each background array in a plurality of directions wherein values corresponding to each of the background pixels are replaced by a weighted average of its own value and a value of its predecessor and values corresponding to each pixel located in a position formerly occupied by a foreground pixel are replaced by a value of a predecessor pixel; and,
   means for dividing the image arrays by a corresponding filtered background array.

8. The system of claim 7 wherein the inputting means comprises a video camera.

9. A method for color normalization of images of a surface, the surface having a background with foreground markings placed thereon, the method comprising steps of:

inputting a surface image comprised of image tiles formed of pixels;

generating image arrays for each RGB color channel of each image tile representing the image;

determining for each image array which of the pixels of the image are background pixels representing the background of the surface and which of the pixels of the image are foreground pixels representing the foreground markings based on pixel intensity and proximity to the white axis in RGB color space;

generating a background array representing the background pixels for each RGB color channel of each image tile based on the determining;

filtering each background array in a plurality of directions wherein values corresponding to each of the background pixels are replaced by a weighted average of its own value and a value of its predecessor and values corresponding to each pixel located in a position formerly occupied by a foreground pixel are replaced by a value of a predecessor pixel;

dividing the image arrays by a corresponding filtered background array to obtain output image tiles; and, generating an output image based on the output image tiles.

10. The method of claim 9 wherein the determining step includes applying a center-surround filter to each pixel.

11. The method of claim 10 wherein the determining step includes applying a thresholding routine to each pixel.

12. The method of claim 11 wherein the determining step includes applying a morphological dilation.

13. The method of claim 9 wherein generating the background array includes removing the foreground pixels from the image array.

14. The method of claim 9 wherein the filtering is performed using a filter of the following form:

$$V'_x \leftarrow \begin{cases} \alpha V_x + (1-\alpha)V'_{x-1} & \text{if background pixel} \\ V'_{x-1} & \text{if foreground pixel} \end{cases}$$

where V represents pixel values, the index x represents a pixel location, $\alpha$ is a constant, the index x−1 indicates the previous pixel position along the direction of the filter's pass and the prime notation indicates a pixel modification in the pass.

* * * * *